United States Patent
Liu et al.

(10) Patent No.: US 7,557,532 B2
(45) Date of Patent: Jul. 7, 2009

(54) VOLTAGE SUPPLYING APPARATUS USING A FUEL CELL

(76) Inventors: Ching-Hsiung Liu, No. 58 Wencheng Road, North District, Tainan City (TW) 70465; Jiann-Fuh Chen, No. 39 Alley 500, Lane 942, Dawan Road, Yongkang City (TW) 710; Wei-Shih Liu, No. 525 Renhua Road, Dali City (TW) 412

( * ) Notice: Subject to any disclaimer, the term of this patent is extended or adjusted under 35 U.S.C. 154(b) by 344 days.

(21) Appl. No.: 11/541,066

(22) Filed: Oct. 2, 2006

(65) Prior Publication Data

US 2007/0070654 A1 Mar. 29, 2007

(30) Foreign Application Priority Data

Sep. 27, 2005 (TW) .............................. 94133587 A

(51) Int. Cl.
  *H01M 10/44* (2006.01)
  *H01M 8/00* (2006.01)
(52) U.S. Cl. ........................ 320/101; 429/13; 180/65.3
(58) Field of Classification Search ................. 320/101; 429/13, 23; 180/65.3
  See application file for complete search history.

(56) References Cited

U.S. PATENT DOCUMENTS

| | | | | |
|---|---|---|---|---|
| 6,321,145 | B1 * | 11/2001 | Rajashekara | ................. 701/22 |
| 6,930,897 | B2 * | 8/2005 | Jungreis et al. | ................ 363/95 |
| 7,049,788 | B2 * | 5/2006 | Itou | ........................... 320/101 |
| 7,207,405 | B2 * | 4/2007 | Reid et al. | ................. 180/65.3 |

* cited by examiner

*Primary Examiner*—Shawn Riley

(57) ABSTRACT

A voltage supplying apparatus using fuel cell to be a voltage source is provided. The voltage supplying apparatus comprises a fuel cell, a DC-DC voltage converter and a control circuit. The DC-DC voltage converter is used to receive the voltage outputted from the fuel cell and then output another voltage. Then, the voltages outputted from the fuel cell and the DC-DC voltage converter are combined to be the output voltage of the voltage supplying apparatus. The control circuit is used to control the operation of the DC-DC voltage converter according to magnitude of the output voltage of the voltage supplying apparatus.

6 Claims, 2 Drawing Sheets

VOLTAGE SUPPLYING APPARATUS USING A FUEL CELL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The invention relates to a type of voltage supplying apparatus specifically designed to use fuel cell as the voltage supplying source for the apparatus.

With the diminishing of global energy source and the rising of environmental protection, conventional energy sources such as gasoline and combustion are becoming more inadequate. Therefore, many researches have been focusing on the development of new energy sources, fuel cell being the main focus.

Emphasis has been put on fuel cell because of its unique features that are in tune with the modern trend for energy: efficiency, cleanness, and quietness. The efficiency of fuel cell system is extremely high, exceeding over 40% efficiency. Combine with cogeneration technique to recycle the heat produced from the reaction and fuel cell can achieve 80% efficiency. In term of cleanness, fuel cell does not produce any kind pollutants during the energy producing process, including voice pollution. Fuel cell can be applied to different fields including electricity, industry, transportation, space industry, and military. Application can be found in power plant, back-up battery, portable power supply, forklift, robot, electric cars, small submarine and even powers for space shuttles.

But fuel cell itself still has some problems, one of them being polarized dependency loss. Due to the inner chemical characteristic of fuel cells, when fuel cells are connected to a load, the voltage of the connected side is easy to alter with the load current. Also, the ratio of alteration can reach 50%. When the load current increases, the amount of change of the fuel cell also increases. Therefore, usually the direct output voltage of the fuel cell is not used. Instead, techniques of power electronics will be used first to stabilize output voltage from the fuel cell. Then, the stabilized voltage will be output for further use. For example, the technique of high frequency switching can be applied, using a DC-DC voltage converter to stabilize the voltage output by the fuel cell.

FIG. 1 demonstrates including a DC voltage supplying device 100, a DC-AC voltage converter, and an Auxiliary Battery 108. DC-AC voltage converter 206 can accept DC voltage supplied by DC voltage supplying device 100 or Auxiliary Battery 108. Then, it can convert the accepted DC voltage to AC output voltage 110. This AC output voltage 110 can be used on many applications, such as e-vehicles or household electricity supplies, etc.

Special attention should be paid that the voltage source output from DC voltage supplying device 100 is produced by a fuel cell 102. However, the voltage output from fuel cell 102 is not directly used as the output voltage for DC voltage supplying device. Intead, it has to be stabilized by a DC-DC voltage converter 104 before it can be used as the output voltage for DC voltage supplying device 100. Fuel cell 102 and DC-DC voltage converter 104 are connected in series. In other words, the output voltage from the fuel cell must be completely processed by the DC/DC converter before it can be output. Nevertheless, there are usually some energy losses when DC-DC voltage converter 104 is put to work. Therefore, when DC-DC voltage converter is stabilizing the output voltage from fuel cell 102, some part of the voltage energy is wasted, causing a decrease in efficiency.

Thus, in voltage supplying devices those use fuel cells as voltage sources, a circuit structure that can lower the energy losses is needed, in order to raise the efficiency of electrical energy used.

BRIEF SUMMARY OF THE INVENTION

The main purpose of this invention is to give a circuit structure for the voltage supplying device.

Another purpose of our invention is to give a voltage supplying circuit structure that increases output efficiency, in which its voltage source is fuel cells.

One more purpose is to give a voltage supplying circuit structure that is used to stabilize output voltage, in which its voltage source is fuel cells.

The fourth purpose of this invention is to give a voltage supplying circuit structure that gives temporary large power output, in which its voltage source is fuel cells.

To achieve the purposes of this invention mentioned above, a fuel cell, a DC-DC voltage converter and a control circuit are included in a preferred embodiment of voltage supplying device that suits this invention. The DC-DC voltage converter is used to accept voltage output from the fuel cell. Then, the converter converts the accepted voltage into its own output voltage. Finally, the total output voltage from the voltage supplying device is obtained by combining the output voltages from the fuel cell and from the DC-DC voltage converter. The control circuit controls the conversion of DC-DC voltage converter in accordance to the magnitude of the total output voltage. This allows the output voltage of the DC-DC voltage converter to be adjusted when the output voltage of the fuel cell undergoes fluctuation. If required by the actual application, the DC-DC voltage converter can be substituted with common flyback, forward, half bridge, full bridge, or push-pull isolated converter.

In a preferred embodiment of voltage supplying device that suits the present invention, a battery backup unit can also be included. This battery backup unit can be common rechargeable batteries, such as lead acid batteries. It is also connected in parallel with the output jacks of the DC-DC voltage converter. This way, this battery backup unit can store electrical energy output from the DC-DC voltage converter. When, the voltage supplying device needs large power output, the electrical energy in the battery backup unit will be released, allowing the voltage supplying device to temporarily give large power output.

BRIEF DESCRIPTION OF THE SEVERAL VIEWS OF THE DRAWING

The aspect of the invention will become apparent upon reading the following detailed description in conjunction with the accompany drawings, in which.

DETAILED DESCRIPTION OF THE INVENTION

Although a known voltage supplying apparatus uses a DC-DC Voltage Converter and a fuel cell in a serial circuit to solve the huge electric energy loss associated with the voltage outputted from fuel cell, this method will decrease the working efficiency of the voltage supplying apparatus. Thus, the basic aspect of the present invention is to combine the output voltage of both the fuel cell and the DC-DC Voltage Converter and making the total output voltage of the voltage supplying apparatus to be the sum of the fuel cell and the DC-DC Voltage Converter not just of the DC-DC Voltage Converter. With this method, the huge electric energy loss associated with DC-DC Voltage Converter can be averted.

Figure 1:
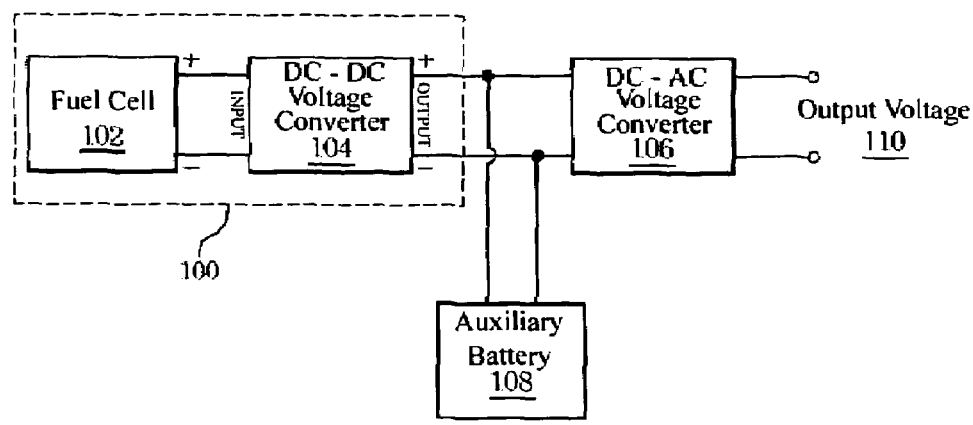
FIG. 1 illustrates a block diagram of a known voltage supplying circuit with fuel cell as the voltage source.
Figure 2:
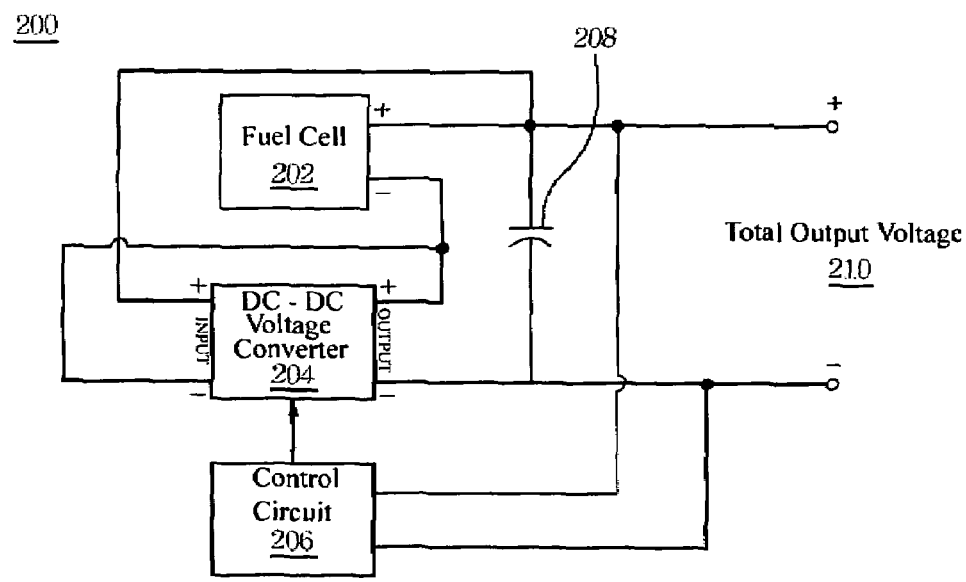
FIG. 2 illustrates a block diagram of a preferred embodiment of the present voltage supplying apparatus invention.

FIG. 2 illustrates a schematic circuit diagram of a voltage supplying apparatus 200 of a preferred embodiment of the present invention. The voltage supplying apparatus 200 comprises of a fuel cell 202, a DC-DC Voltage Converter 204, and a control circuit 206. The voltage source for the voltage supplying apparatus 200 is produced by fuel cell 202. The output voltage supplied by fuel cell 202 is directly transmitted to DC-DC Voltage Converter 206. In another word, the positive output terminal and the negative output terminal of fuel cell 202 are connected to the positive input terminal and the negative input terminal of DC-DC Voltage Converter 206.

Because of the chemical feature of fuel cell, the output voltage of fuel cell 202 is slightly unstable and creates huge fluctuation as a result. DC-DC Voltage Converter 204, on the other hand, takes advantage of high-frequency switching and stabilizes the unstable direct current voltage. Finally, the output voltage of both fuel cell 202 and DC-DC Voltage Converter 204 are combined to get the total output voltage 210 for the voltage supplying apparatus 200. In this preferred embodiment, the positive output terminal of DC-DC Voltage Converter 204 is connected to the negative output terminal of fuel cell 202. The potential difference between the positive output terminal of fuel cell 202 and the negative output terminal of DC-DC Voltage Converter 204 is total output voltage 210. The actual circuit connection is not restricted to this preferred embodiment. As long as the output voltage of fuel cell 202 and DC-DC Voltage Converter 204 are outputted together, the idea will still work.

An unstable voltage is generated by fuel cell 202, so total output voltage 210 is also an unstable voltage. However, as the circuit diagram in FIG. 2 illustrates, total output voltage 210 can be compensated to a stable voltage by using DC-DC Voltage Converter 204. The control circuit 206, in voltage supplying apparatus 200, is used in combination with DC-DC Voltage Converter 204 to control the conversion carried out by DC-DC Voltage Converter 204, so it can regulate the magnitude of DC-DC Voltage Converter output voltage. Thus, in the preferred embodiment, the control circuit 206 monitors the magnitude of the total output voltage 210. When total output voltage 210 becomes unstable, stabilization can be achieved through controlling the magnitude for the output voltage of DC-DC Voltage Converter 204. In another word, when output voltage of fuel cell 202 decreases, the output voltage of DC-DC Voltage Converter 204 will increase upon control. When output voltage of fuel cell 202 increases, the output voltage of DC-DC Voltage Converter 204 will decrease and maintains a set value for the total output voltage 210.

Furthermore, the stability of the total output voltage 210 can be enhanced by having DC Bulk Capacitors 208 in a parallel circuit with the two terminals of the total output voltage 210.

Isolated converter such as flyback, forward, half bridge, full bridge, or push-pull can be used as the DC-DC Voltage Converter 206 for the above mentioned voltage supplying apparatus 200.

Figure 3:
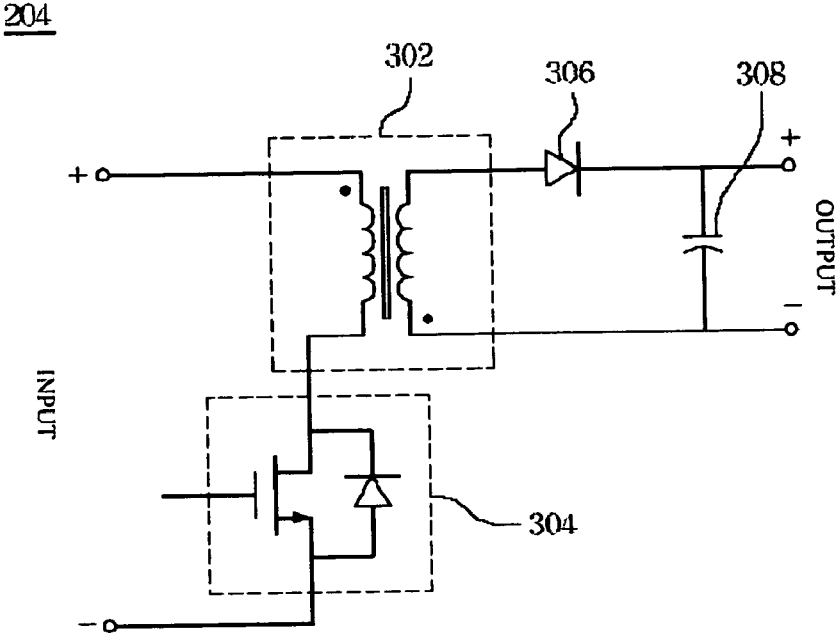
FIG. 3 illustrates a topology of a flyback isolated converter.

FIG. 3 illustrates a flyback isolated converter circuit that is used to achieve the same function as the DC-DC Voltage Converter 204 illustrated in FIG. 2. The circuit comprises a transformer 302, a Switching Component 204, a diode 306, and a DC Bulk Capacitor 308. In this preferred embodiment, the metal-oxide-semiconductor field-effect transistor (MOSFET) is used as the Switching Component 304. The gate terminal of switching component 304 is controlled by the same control circuit 206 shown in FIG. 2. When control circuit operates Switching Component 304, electric current will immediately flow through the first side of transformer 302 and induced voltage will be produced from the second side of transformer 302. The first side and the second side of transformer 302 have opposite polarity, so diode 306 will sever the transmission of induced voltage and allows the energy transmitted by the first side to be stored in transformer 302 until component switch 304 is cut-off. The DC Bulk Capacitor 308 is also used to stabilize the output voltage on the second side.

The above mentioned example is of the flyback isolated converter circuit, but because the principles are the same with other types of isolated converter circuit, they can also be applied in the present invention. Different types of isolated converter circuit have different features. For example, flyback and forward isolated converter have lower cost, so they are perfect for low power application. On the other hand, half bridge, full bridge, and push-pull isolated converter have effective transformer utilization rate, they are more suited for high power application.

Figure 4:
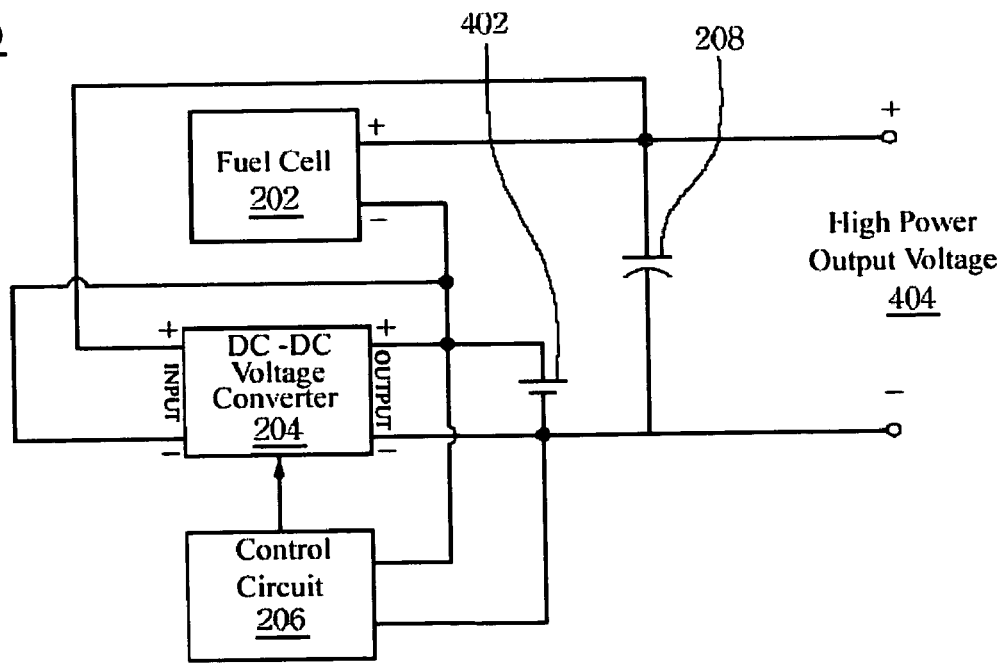
FIG. 4 illustrates a block diagram of another preferred embodiment of the present voltage supplying apparatus invention.

Fuel cells are often applied as the power source for advance vehicles. The vehicle itself has variable load that, beside the standard output range, will require high power output (when climbing a hill) as well. When high power output is required, just as the schematic circuit of the voltage supplying apparatus 400 in FIG. 4, a battery backup unit 402 in parallel circuit with the output terminal of DC-DC Voltage Converter 204 will help with the supply of high power output voltage 404. Beside the addition of battery backup unit 402 and having control circuit 206 monitors the terminal voltage of the battery backup unit 402, other parts of the voltage supplying apparatus are the same as the voltage supplying apparatus 200 shown in FIG. 2. Battery backup unit 402 can be any common rechargeable batter such as a lead acid battery. This way, the electric energy outputted by DC-DC Voltage Converter 204 can first be stored in battery backup unit 402 until high power output is required by voltage supplying apparatus 400. Battery backup unit 402 helps in supplying part of the output power. Thus, in this preferred embodiment, control circuit 206 monitors the terminal voltage of battery backup unit 402. When the energy stored in battery backup unit 402 is low, DC-DC Voltage Converter 204 is immediately activated to recharge battery backup unit 402 and maintain the availability of battery backup unit 402. As can be seen in the schematic circuit of the preferred embodiment of the present invention, the goal of high power output can easily be achieved.

Although the present invention is based on a preferred embodiment as shown above, its application does not restrict to the present invention. Anyone who is knowledgeable in this field is able to make any modification within the concept and perimeter of the present invention. Therefore in order to seek protection, the following claims are stated.

The invention claimed is:

1. A voltage supplying apparatus, used to output a total output voltage, comprising:
a fuel cell used to output a first output voltage; a DC-DC Voltage Converter used to receive said first output voltage and perform a conversion of said first output voltage to a second output voltage, where a positive input terminal of said DC-DC Voltage Converter and a negative input terminal of said DC-DC Voltage Converter are electrically connected with a positive output terminal of said fuel cell and a negative output terminal of said fuel cell respectively, a positive output terminal of said DC-DC Voltage Converter is electrically connected with a negative output terminal of said fuel cell, and a positive output terminal of said fuel cell with a negative output terminal of said DC-DC Voltage Converter are used to supply said total output voltage, wherein said total output voltage equal to the sum of the first output voltage and the second output voltage; and a control circuit used to control the voltage conversion of said DC-DC Voltage Converter.

2. The voltage supplying apparatus of claim 1 wherein said control circuit controls said conversion of said DC-DC Voltage Converter in accordance to the magnitude of said total output voltage and therefore stabilizes the magnitude of said output voltage.

3. The voltage supplying apparatus of claim 1 wherein said DC-DC Voltage Converter is a flyback isolated converter, a forward isolated converter, a half bridge isolated converter, a full bridge isolated converter or a push-pull isolated converter.

4. The voltage supplying apparatus of claim 1 further comprising a battery backup unit that is in parallel circuit between the positive output terminal of said DC-DC Voltage Converter and the negative output terminal of said DC-DC Voltage Converter and stores the electric energy supplied by said DC-DC Voltage Converter.

5. The voltage supplying apparatus of claim 4 within said control circuit activates said conversion of said DC-DC Voltage Converter in accordance to the magnitude of voltage terminal of said battery backup unit.

6. The voltage supplying apparatus of claim 1 further comprising a DC Bulk Capacitor that is in a parallel circuit with said total output voltage.

* * * * *